United States Patent [19]

Tsai et al.

[11] Patent Number: 5,636,240
[45] Date of Patent: Jun. 3, 1997

[54] AIR POLLUTION CONTROL PROCESS AND APPARATUS FOR GLASS FURNACE

[75] Inventors: Jeng-Syan Tsai; Jyh-Feng Hwang, both of Hsinchu, Taiwan

[73] Assignee: Industrial Technology Research Institute, Hsinchu, Taiwan

[21] Appl. No.: 341,056

[22] Filed: Nov. 16, 1994

[51] Int. Cl.⁶ .................................................. C03B 5/02
[52] U.S. Cl. .................. 373/27; 65/27; 423/242.1; 373/8
[58] Field of Search ............................ 373/8, 9, 27, 30; 65/27, 32, 134; 110/210, 345; 420/582; 75/586, 654; 423/242, 243, 244 A, 240 R, 240 S, 244 R, 210, 230, 241

[56] References Cited

U.S. PATENT DOCUMENTS

| | | |
|---|---|---|
| 4,197,278 | 4/1980 | Gehri et al. .................... 423/242 |
| 4,372,770 | 2/1983 | Krumwiede et al. ............... 65/27 |
| 4,668,489 | 5/1987 | Alexander et al. ............... 423/240 |
| 5,198,190 | 3/1993 | Philipp et al. .................. 420/582 |

Primary Examiner—Tu Hoang
Attorney, Agent, or Firm—Beveridge, DeGrandi, Weilacher & Young, LLP

[57] ABSTRACT

An air pollution control process and apparatus for glass furnaces for use in the furnace's waste gas outlet including passing the waste gases through a spray type neutralization tower to remove sulphates in the waste gases by spraying an absorbent (NaOH) to reduce the opacity of exhaust gas, and employing a pneumatic powder feeding device to feed flyash or calcium hydroxide periodically in a path between the spray type neutralization tower and a bag house to maintain normal functioning of the filter bag in the bag house.

6 Claims, 3 Drawing Sheets

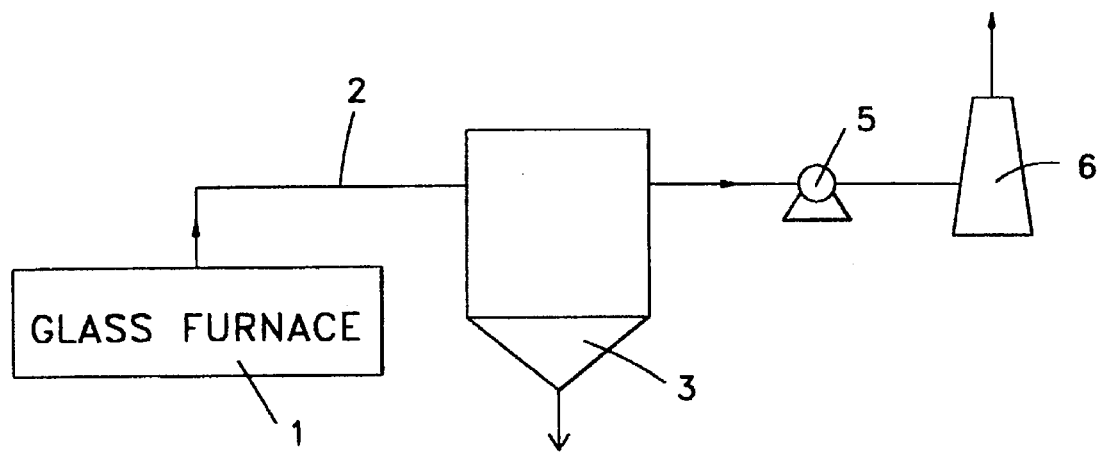
PRIOR ART  FIG.1
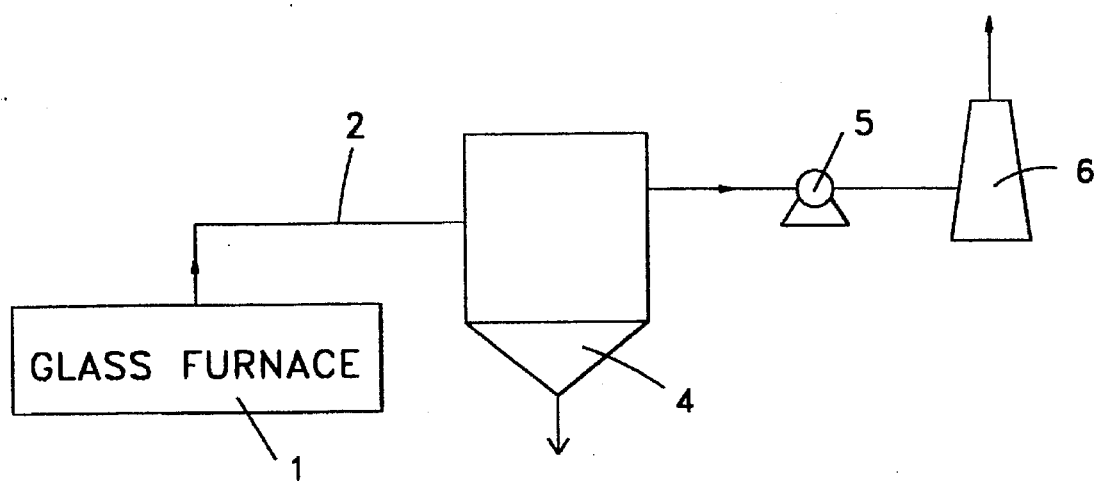
PRIOR ART  FIG.2

5,636,240

AIR POLLUTION CONTROL PROCESS AND APPARATUS FOR GLASS FURNACE

FIELD OF THE INVENTION

The present invention relates generally to an air pollution control process and apparatus, and more particularly to an air pollution control process and apparatus for flue gases in glass furnaces or similar equipment.

BACKGROUND OF THE INVENTION

Waste gases produced by glass furnaces are of a different nature from those produced by other types of furnaces, because the waste gases produced after combustion of raw materials and fuel used in the glass furnace contain acidic gases with a higher concentration of sulphur compounds, such as sulphur dioxide ($SO_2$) and sulphur trioxide ($SO_3$), even the particulates produced also contain acidic substances such as sodium sulphate ($Na_2SO_4$). Because sulphur trioxide readily combines with water moisture in the atmosphere to form sulphuric acid gases ($H_2SO_4$), fumes formed by such acidic gases may cause sunlight diffraction, which is the cause of the increase in opacity of the atmosphere. Such acidic fumes are also one of the factors for the formation of acid rain.

There are two kinds of prior techniques of handling waste gases produced by glass furnaces. In the first kind of prior technique as shown in FIG. 1, waste gases discharged by a glass furnace 1 are sent via a flue 2 to an electrostatic precipitator 3 for treatment; thereafter, the waste gases are drawn by a fan 5 to be discharged through a chimney 6. This is a normal method of discharging waste gases, but the cost of the apparatus for carrying out this method is high so that it is not generally adopted.

The other kind of prior technique as shown in FIG. 2 involves a less expensive apparatus, and its flow-chart is similar to that shown in FIG. 1; but in this method, a bag house 4 takes the place of the electrostatic precipitator 3 in the former method. In this conventional method wherein the bag house 4 is installed in the flue 2, the particulates and acidic gases produced by the glass furnace 1 may clog the air pores of the filter bag which becomes very difficult to clean; as a result, the life of the filter bag is shortened; additionally, the operational pressure of the fan 5 is caused to become abnormal.

Bag houses are commonly used in flues of various kinds of equipment to filter particulates and flyash. As regards the process of treating waste gases from glass furnaces, the conventional technique as shown in FIG. 2 is to install the bag house 4 directly in the flue 2 of the glass furnace 1. As a result of this arrangement and because of the characteristics of the waste gases produced by the glass furnace mentioned above, the conventional process is ineffective in terms of improving the opacity of the waste gases and the formation of acid rain as well prevention of rapid damage to the filter bag in the bag house.

SUMMARY OF THE INVENTION

The primary object of the present invention is to provide an air pollution control process and apparatus for use in glass furnaces so that waste gases discharged therefrom meet the requirement of environmental protection standards (opacity).

Another object of the present invention is to provide an air pollution control process and apparatus for use in glass furnaces to ensure that its bag house functions normally and to facilitate cleaning of the filter bag.

A further object of the present invention is to provide an air pollution control process and apparatus adapted for use not only in glass furnaces but also in furnaces which may produce acidic waste gases, particulates, and flyash.

To achieve the above-mentioned objects, the present invention comprises passing waste gases into a spray type neutralization tower to remove sulphur compounds in the waste gases with basic absorbent substances [NaOH (aq)], and employing a pneumatic powder feeding device for spraying chemical powders [flyash, $Ca(OH)_2$] into the path between the spray type neutralization tower and a bag house so as to ensure that its filter bag functions normally.

BRIEF DESCRIPTION OF THE DRAWINGS

The foregoing and other features and advantages of the present invention will be more clearly understood from the following detailed description and the accompanying drawings, in which, FIGS. 1 and 2 are respective schematic flow-charts of prior techniques;

DETAILED DESCRIPTION OF THE PREFERRED EMBODIMENTS

The air pollution control process according to the present invention is adapted for use in a waste gas outlet of a glass furnace to reduce opacity of the waste gases and to prevent clogging of a filter bag in a bag house. The process comprises installing a spray type neutralization tower at the waste gas outlet of the glass furnace; introducing the waste gases through a spray zone in the spray type neutralization tower so that sulphur compounds in the waste gases combine with the basic spray and coagulate; installing a bag house so that its gas inlet connects to the spray type neutralization tower; installing a pneumatic powder feeding device so that its powder feeding outlet connects to a waste gas path in front of the gas inlet of the bag house; and feeding a dry basic chemical powder periodically into the waste gas path in front of the bag house by means of the pneumatic powder feeding device so that the powder adheres to a filter bag in the bag house to form a protective film thereon.

Figure 3:
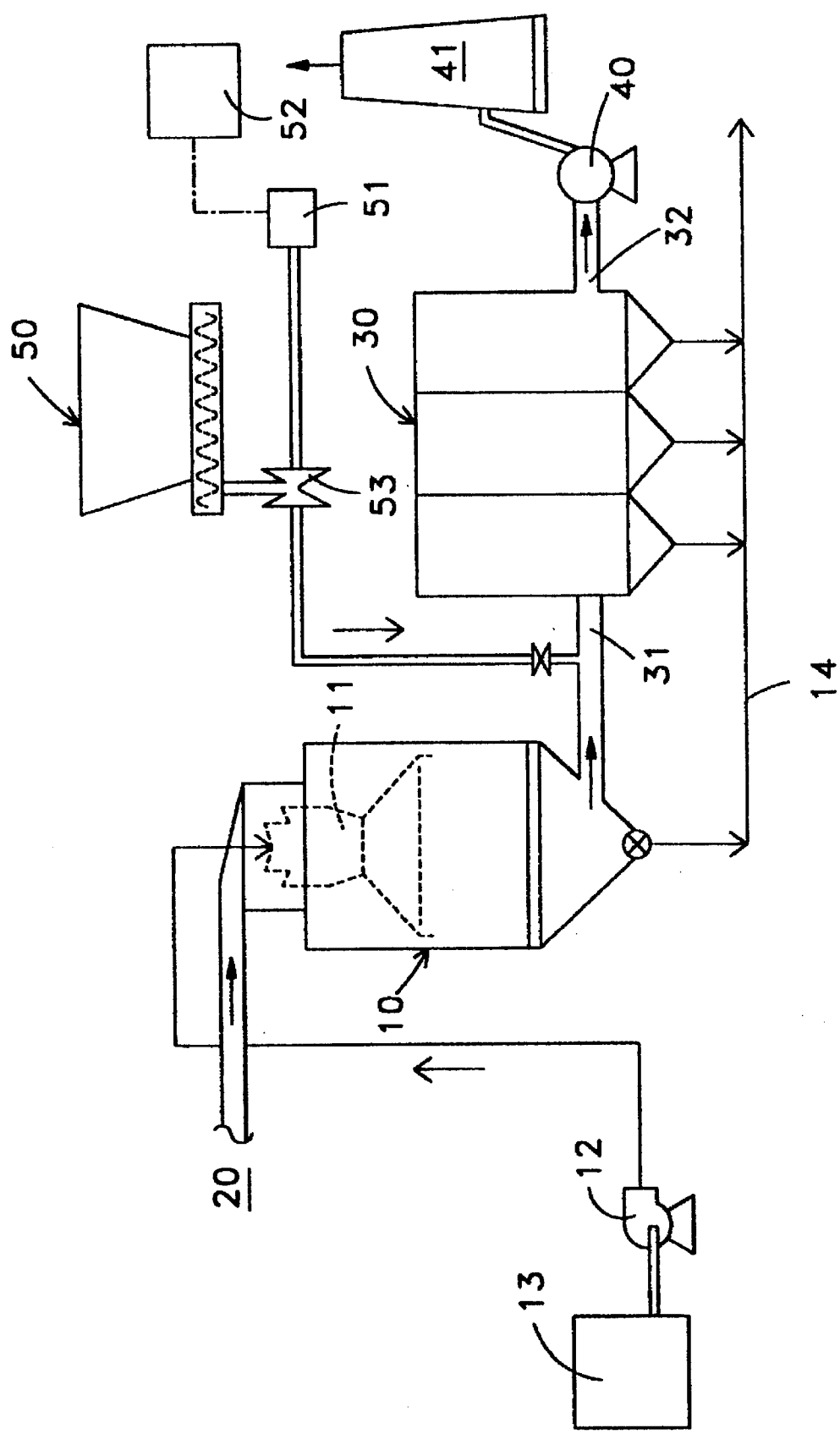
FIG. 3 is a schematic view of a flow-chart of a preferred embodiment of the present invention.
Figure 4:
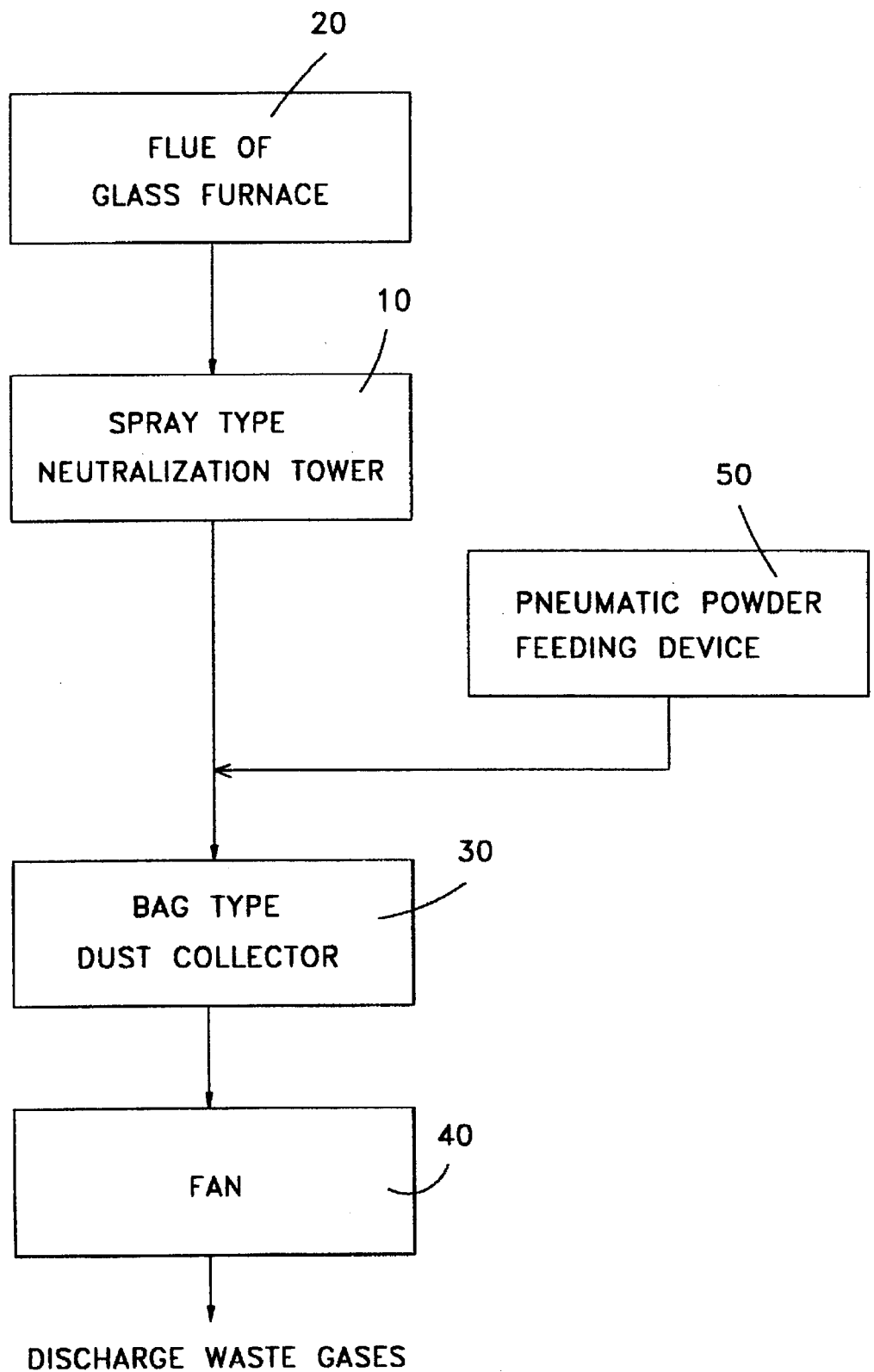
FIG. 4 is a block diagram of a flow-chart of the preferred embodiment of the present invention.

With reference to FIGS. 3 and 4, the air pollution control apparatus provided by the present invention is adapted for use in the waste gas outlet of the glass furnace to reduce the opacity of waste gases and to maintain the normal functions of the filter bag. The apparatus mainly comprises a spray type neutralization tower 10 and a pneumatic powder feeding device 50, both of which may be installed singly or together in between a flue 20 of a glass furnace and a bag house 30. The bag house 30 has a gas inlet 31 and a gas outlet 32 which connects to a fan 40 to discharge waste gases. The spray type neutralization tower 10 has provided therein an atomizer 11 which sprays absorbent substances to remove sulphur compounds in the waste gases; additionally, the pneumatic powder feeding device 50 installed between the spray type neutralization tower 10 and the bag house 30 periodically feeds chemicals such as sodium hydroxide compounds or flyash into the path therebetween to prevent clogging of a filter bag in the bag house 30.

With reference to FIG. 1, a considerable amount of acidic gases are emitted when waste gases are discharged from the glass furnace. A pump 12 connecting to the apparatus of the present invention transfers a basic solution of calcium hydroxide from a storage tank 13 to the atomizer 11 of the spray type neutralization tower 10 for spraying so that the basic solution combines with the acidic gases and particulates in the waste gases within the spray type neutralization tower 10 to remove acidic substances such as sulphur dioxide and sulphur trioxide ($SO_2$, $SO_3$) in the waste gases. Subsequently, the sodium sulphate ($Na_2SO_4$) particulates reacted with the solution of sodium hydroxide are dried by the intense heat of the waste gases and drop in powder form. A large proportion of the powder is collected by a recovery conduit 14 located at the bottom of the spray type neutralization tower 10, and a small proportion of the powder enters the bag house 30 to be filtered.

The powders stored in the pneumatic powder feeding device 50 are dry hydroxide compounds such as calcium hydroxide or flyash. When the bag house 30 is in use, the control device 52 may control a blower 51 to force the powders which are stored in a funnel and fed via a hopper device into a Venturi tube 53 to feed into the path in front of the gas inlet 31 of the bag house 30 periodically and in a fixed amount. They are then automatically coated onto an outer layer of the filter bag in the bag house 30 temporarily to form a thin protective film, which absorbs the residual wetness and some acidic gases in the waste gases transferred from the spray type neutralization tower 10. After a period of absorption, vibration caused by the bag house 30 on the filter bag or reverse blowing causes the powders attached on the outer layer of the filter bag to drop and the powders are then removed by the recovery conduit 14. Then the pneumatic powder feeding device 50 feeds a fixed amount of powder into the gas inlet 31 again so that a new film of powder is formed on the outer layer of the filter bag. In this way, the filter bag will not be easily damaged or clogged by acidic substances and particulates. The waste gases, after treatment by the bag house 30, are sent via the gas outlet 32 to the chimney 41 by the fan 40 to be discharged to the atmosphere.

Although the present invention has been illustrated and described with reference to the preferred embodiments thereof, it should be understood that it is in no way limited to the details of such embodiments. For instance, the spray type neutralization tower may be used alone or the pneumatic powder feeding device may be used independently in the flue of glass furnaces or similar furnaces. These and other modifications are deemed to be within the scope of the appended claims.

What is claimed is:

1. An air pollution control process for use in a waste gas outlet of a glass furnace to reduce the opacity of waste gases and to prevent a filter bag in a bag house from clogging, said process comprising the following steps of:

installing a spray type neutralization tower at said waste gas outlet of said glass furnace;

introducing the waste gases through a spray zone in the spray type neutralization tower so that sulphur compounds in the waste gases combine with a basic spray and coagulate;

installing said bag house so that a gas inlet thereof connects to said spray type neutralization tower;

installing a pneumatic powder feeding device so that a powder feeding outlet thereof connects to a waste gas path in front of said gas inlet of said bag house; and feeding dry basic chemical powders into said waste gas path in front of said bag house periodically by means of said pneumatic powder feeding device so that the powders adhere to said filter bag in said bag house to form a protective film.

2. An air pollution control process as claimed in claim 1, comprising an additional step of supplying a solution of sodium hydroxide and water to said spray type neutralization tower for spraying.

3. An air pollution control process as claimed in claim 1, comprising an additional step of supplying dry calcium hydroxide compounds or flyash to said pneumatic powder feeding device.

4. An air pollution control apparatus for use in a waste gas outlet of a glass furnace to reduce opacity of waste gases and prevent clogging of a filter bag in a bag house, said apparatus comprising:

a spray type neutralization tower installed in said waste gas outlet of said glass furnace, said spray type neutralization tower having a gas inlet and a gas outlet with a gas path formed between said gas inlet and said gas outlet, and an atomizer disposed therein for forming an effective spray zone when spraying, said gas path penetrating said effective spray zone of said atomizer;

a bag house having a gas inlet and a gas outlet, said gas inlet being connected to said gas outlet of said spray type neutralization tower; and a pneumatic powder feeding device having a chemical feeding outlet and a periodic chemical feeder, said feeding outlet being linked to a gas path formed between said gas inlet of said bag house and said gas outlet of said spray type neutralization tower, and said periodic chemical feeder supplying periodically chemical substances into said chemical feeding outlet.

5. An air pollution control apparatus as claimed in claim 4, wherein said atomizer within said spray type neutralization tower sprays a basic solution of sodium hydroxide and water.

6. An air pollution control apparatus as claimed in claim 4, wherein said pneumatic powder feeding device feeds periodically a dry calcium hydroxide compound.

* * * * *